Aug. 22, 1950     A. E. TROUT     2,519,986
BABY FOOD FORMULA CONTAINER
Filed June 30, 1949
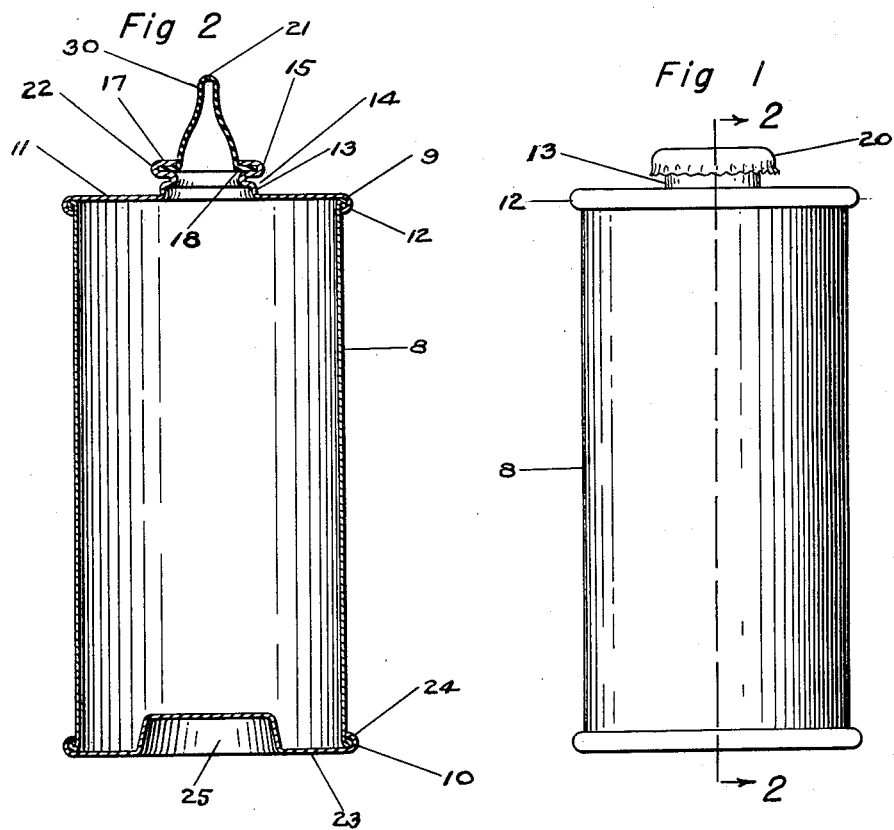
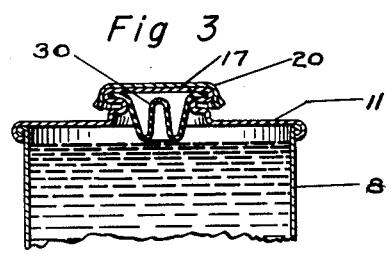
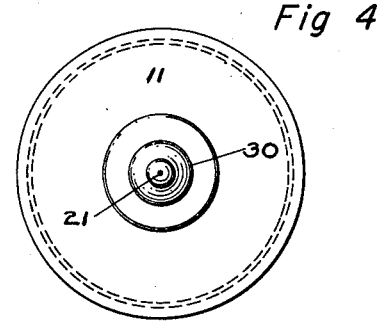
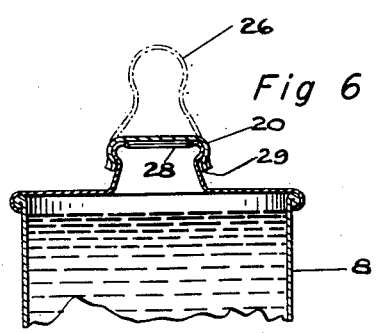
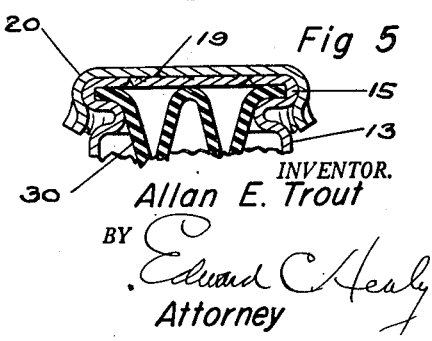
INVENTOR.
Allan E. Trout
BY Edward C. Healy
Attorney Patented Aug. 22, 1950

2,519,986

UNITED STATES PATENT OFFICE 2,519,986

BABY FOOD FORMULA CONTAINER

Allan E. Trout, Sharp Park, Calif.

Application June 30, 1949, Serial No. 102,421

1 Claim. (Cl. 215—11)

This invention relates to an improved baby food formula container and has for the primary object the provision of a liquid formula which is completely mixed and vacuum packed in a specially constructed container, requiring only the necessity of warming the liquid in order to serve the same.

Another object in the present invention is the provision of a vacuum sealed baby food formula container that is provided with means for carrying a nipple, whereby the formula is capable of being fed to the baby directly from the container.

A further object of the present invention is the provision of a vacuum packed baby food liquid formula container provided with an upwardly extending open portion capable of having a cap crimped thereon and further provided with a nipple fixed to the container over the said open portion, which nipple is capable of being extended in the container beneath the said cap and emerge from the container when the cap is removed therefrom.

A still further object of the present invention is to circularly score the central portion of the top of the container beneath the cap and around the nipple and to weld or otherwise suitably fix the portion of the container within the scored circle to the cap, whereby the said portion within the scored circle will be broken from the container when the cap is removed.

A still further object of the present invention is the provision of a specially constructed container, capable of retaining therein a completely mixed liquid baby food formula, which container is durable, simple in construction, economical to manufacture, highly efficient and serviceable in use, and is provided with a suitable nipple fixed to the container or removably mounted thereon.

Other objects and advantages will be apparent during the course of the following description.

In the accompanying drawing forming a part of the specification, wherein for the purpose of illustration, like numerals designate like parts throughout the same, Fig. 1 is a side elevational view of one type of container employed in the invention, Fig. 2 is a central vertical sectional view taken on line 2—2 of Fig. 1, particularly illustrating the construction provided for holding the nipple and showing the same emerged from the container, Fig. 3 is a central vertical sectional fragmentary view of the upper portion of the container, showing the removable cap thereon and the nipple collapsed and extended in the container, Fig. 4 is a top plan view of the container, the cap being removed for enabling the nipple to be illustrated, Fig. 5 is an enlarged vertical sectional view of the cap and the crown portion of the container upon which the cap is mounted, particularly illustrating the score on the inner surface of the face of the crown and the portion welded to the cap, and Fig. 6 is a vertical sectional fragmentary view of a modified form of the invention illustrating how a nipple can be removably positioned on the crown of the container.

Referring in detail to the drawing and the numerals thereof the numeral 8 designates the vertical body portion of the container, made of a suitable sheet metal and is preferably round in shape and formed with overlapping upper and lower ends 9 and 10, respectively, as disclosed to advantage in Fig. 2. The numeral 11 designates the top cover of the container, which cover is crimped on and around the upper body overlapped ends 9, as at 12, and is formed with a circular upwardly extending central portion 13, forming a ring, which ring terminates in an outer circumferential groove 14. A second upwardly extending portion forming a ring 15 leads from the said groove 14 to the top horizontal face 17, forming an inner circumferential groove 18, all of which construction forms the crown of the container. A suitable cap 20 is crimped on the crown as disclosed to advantage in Figs. 1 and 3. The said cap is welded to the horizontal face 17 of the crown as at 19, the welding being performed before the top cover 11 is crimped on the body 8. A suitable nursing nipple 30, having an orifice as at 21, a bottom circular flange 22, and formed of rubber, flexible plastic, or any other suitable material is provided and the flange portion thereof is inserted in the inner groove 18 of the crown as disclosed to advantage in Figs. 2 and 3. The said groove is first formed of a greater width than the thickness of the flange and after the flange is assembled therein, the top face 17 of the crown is pressed downwardly tightening the parts one to the other. The said cover is crimped on the body of the container, as at 12, after the cover has been formed and the parts thus assembled. The bottom 23 is crimped on the over-lapped end portion 10, as at 24, thus providing an airtight container. The said bottom is formed with a cavity 25 for receiving the crown of the container, whereby the containers can be conveniently stacked one on the other.

In the modified view disclosed to advantage in Fig. 6 the container is identical to that disclosed in Figs. 1, 2 and 3. The nipple 26 is of the nursing bottle type that fits around the outer periphery and neck of the bottle. The crimped cap 20 is pulled off the crown tearing the scored portion 27 therefrom, forming the opening 28. The nipple is then positioned on the crown over the said opening. Conventional nursing bottle nipples are formed with a bottom inwardly extending flange 29, which flange is adapted to extend in the circular groove 14 and the neck portion of the nipple in proximity to the said flange 29 tightly fit around the ring 15 above said groove, whereby the nipple is securely and removably positioned on the crown.

The container is vacuum packed with the liquid baby formula in the conventional manner well known in the art of vacuum packing. The scored weakened portion formed on the crown of the container provides a completely sealed can and due to the portion within the scored circle being welded or otherwise suitably fixed to the cap, the said portion will be removed with the cap. In the illustrations disclosed to advantage in Figs. 2 and 3 it will be obvious that when the cap is removed the nipple will automatically emerge from the bottle and be ready for use, the said nipple being retained in a sanitary condition. It will thus be seen that when it is desired to feed the formula to the baby all that is required is to warm the container and remove the cap therefrom and all tedious labor such as weighing and measuring the ingredients, bottling the same, keeping the same in a refrigerator to prevent spoilage and washing and sterilizing the bottles, etc. is eliminated.

Although the crown is preferably formed with a weakened portion over which the cap is crimped it will be obvious that both the weakened portion in the crown and the cap crimped on the crown can be eliminated, if desired, and the top surface of the crown apertured for enabling the liquid to flow to the nipple.

It is to be understood that the form of my invention herewith shown and described is to be taken as a preferred example of the same and that various changes relative to the shape, size, material and arrangement of parts may be resorted to without departing from the spirit of the invention or the scope of the subjoined claim.

Having thus described my invention, I claim:

A device of the character described for use in feeding babies and the like, comprising an air tight elongated container capable of retaining therein a quantity of vacuum packed liquid food, a crown formed on the upper end portion of the container, said crown being an integral part of the said end portion of the container, a circular score formed in the face of the crown providing a weakened area therein, a cap crimped on the crown and capable of being removed therefrom, the said cap being secured to the crown within the said circular score formed therein, whereby the area within the score is capable of being removed with the cap to form an opening in the crown, an inner circumferential groove formed in the crown and a nipple having an annular flange secured in said groove, the said nipple being retained in the container before the cap is removed and adapted to emerge through the opening formed by removing the cap.

ALLAN E. TROUT.

REFERENCES CITED

The following references are of record in the file of this patent:

UNITED STATES PATENTS

| Number | Name | Date |
| --- | --- | --- |
| 2,077,027 | Torras | Apr. 13, 1937 |
| 2,432,496 | Beason | Dec. 16, 1947 |
| 2,438,299 | Relis | Mar. 23, 1948 |
| 2,471,172 | Stoller | May 24, 1949 |